(12) United States Patent
Malheiro

(10) Patent No.: US 11,465,707 B2
(45) Date of Patent: Oct. 11, 2022

(54) MODULAR SCOOTER WITH SUSPENSION AND COLLAPSIBLE COMPONENTS

(71) Applicant: John Malheiro, New York, NY (US)

(72) Inventor: John Malheiro, New York, NY (US)

( * ) Notice: Subject to any disclaimer, the term of this patent is extended or adjusted under 35 U.S.C. 154(b) by 222 days.

(21) Appl. No.: 16/601,518

(22) Filed: Oct. 14, 2019

(65) Prior Publication Data

US 2020/0172191 A1 Jun. 4, 2020

Related U.S. Application Data

(60) Provisional application No. 62/773,813, filed on Nov. 30, 2018.

(51) Int. Cl.
| | | |
|---|---|---|
| *B62K 5/05* | (2013.01) | |
| *B62K 21/22* | (2006.01) | |
| *B62K 5/027* | (2013.01) | |
| *B62L 3/00* | (2006.01) | |
| *B62J 1/08* | (2006.01) | |
| *B62K 25/04* | (2006.01) | |
| *B62K 27/12* | (2006.01) | |
| *B62K 5/08* | (2006.01) | |

(52) U.S. Cl.
CPC ........ *B62K 5/05* (2013.01); *B62J 1/08* (2013.01); *B62K 5/027* (2013.01); *B62K 21/22* (2013.01); *B62K 25/04* (2013.01); *B62K 27/12* (2013.01); *B62L 3/00* (2013.01); *B62K 5/08* (2013.01); *B62K 2202/00* (2013.01)

(58) Field of Classification Search
CPC .......... B62K 5/05; B62K 5/027; B62K 21/22; B62K 25/04; B62K 27/12; B62K 5/08; B62K 2202/00; B62K 3/12; B62K 2204/00; B62K 5/10; B62K 15/00; B62K 21/12; B62K 27/003; B62K 3/002; B62J 1/08; B62L 3/00
See application file for complete search history.

(56) References Cited

U.S. PATENT DOCUMENTS

| | | | | |
|---|---|---|---|---|
| 6,808,187 B1* | 10/2004 | Harris | .................... | B62K 3/002 |
| | | | | 280/87.01 |
| 7,044,488 B1* | 5/2006 | Hamend | ................ | B62K 3/002 |
| | | | | 280/221 |
| 7,125,080 B1* | 10/2006 | Jarema, III | .......... | B60N 2/3011 |
| | | | | 297/411.32 |

(Continued)

FOREIGN PATENT DOCUMENTS

FR 3074450 A1 * 6/2019 ........... B62K 27/003

*Primary Examiner* — Darlene P Condra
(74) *Attorney, Agent, or Firm* — Christopher Pilling

(57) ABSTRACT

A modular scooter with suspension and collapsible components is provided. The modular scooter having a plurality of wheels attached to the underside of a large planar deck with a plurality of selectively, collapsible, telescoping handle bar posts configured for multiple riders thereon. The modular scooter also including a collapsible seat post and seat combination, allowing a passenger, such as child to sit during the ride. A wishbone, tilting suspension allowing a driver to lean into turns is also provided. The present invention also having the ability to be linked and interlocked remotely to other similar scooters or trailers and to be converted into other forms of three-wheeled transport such as, but not limited to a wagon, delivery scooter, and the like.

11 Claims, 6 Drawing Sheets

(56) References Cited

U.S. PATENT DOCUMENTS

| | | | | |
|---|---|---|---|---|
| 8,181,975 | B2* | 5/2012 | Parhar | B62K 3/002 |
| | | | | 280/87.041 |
| 9,150,064 | B1* | 10/2015 | Landreth | B60D 1/18 |
| 9,789,894 | B2* | 10/2017 | Weber | B62B 5/082 |
| 9,889,368 | B1* | 2/2018 | Chen | A63C 17/0033 |
| 2009/0194960 | A1* | 8/2009 | Peterson | B62K 3/002 |
| | | | | 280/87.041 |
| 2012/0248720 | A1* | 10/2012 | Grata | B62K 27/003 |
| | | | | 280/47.4 |
| 2012/0313349 | A1* | 12/2012 | Shalaby | B62B 5/00 |
| | | | | 280/504 |
| 2013/0307234 | A1* | 11/2013 | Anders | B60D 1/065 |
| | | | | 280/32.7 |
| 2014/0008882 | A1* | 1/2014 | Liao | B62K 15/006 |
| | | | | 280/40 |
| 2015/0122566 | A1* | 5/2015 | Constien | B62K 5/05 |
| | | | | 180/210 |
| 2016/0096576 | A1* | 4/2016 | Gotfrid | B62K 15/006 |
| | | | | 280/641 |
| 2017/0341698 | A1* | 11/2017 | McManus | B60D 1/065 |
| 2020/0017033 | A1* | 1/2020 | Shaw | B60R 9/06 |
| 2020/0047840 | A1* | 2/2020 | Newby | B62K 21/12 |
| 2021/0253153 | A1* | 8/2021 | Mallette | B62K 13/00 |
| 2021/0300503 | A1* | 9/2021 | North | B62M 6/45 |
| 2021/0316810 | A1* | 10/2021 | Bonanno | B62K 5/003 |

* cited by examiner

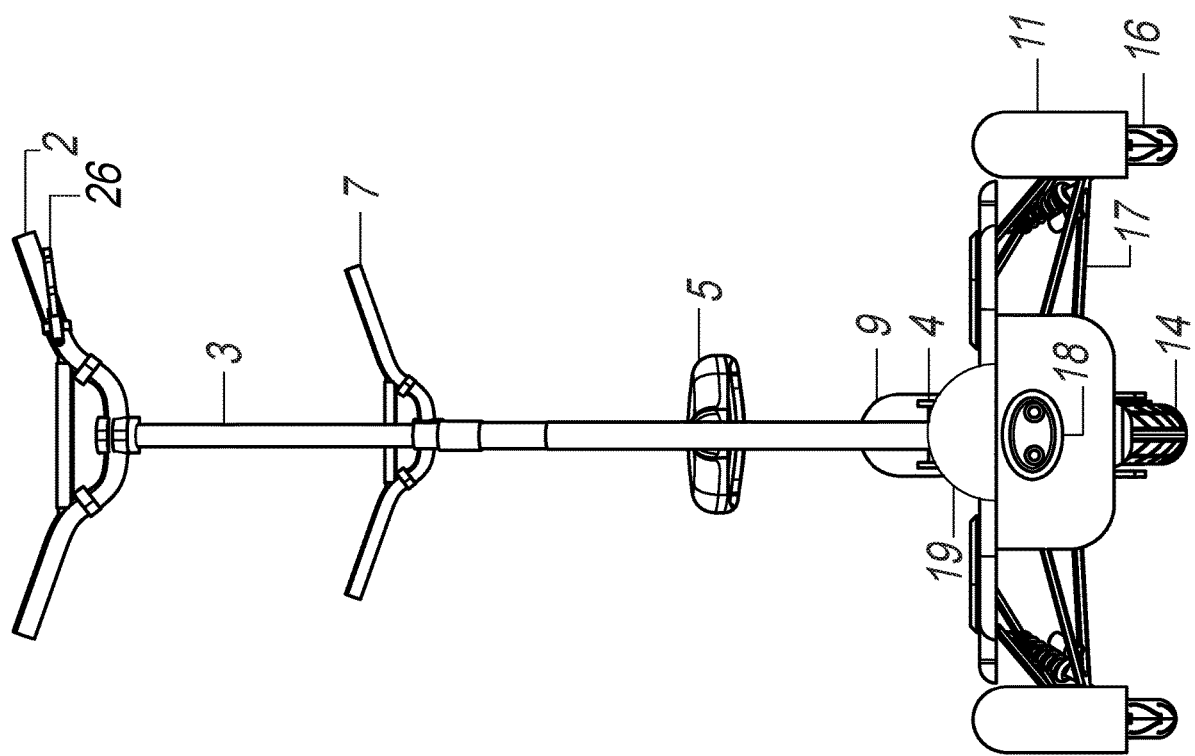

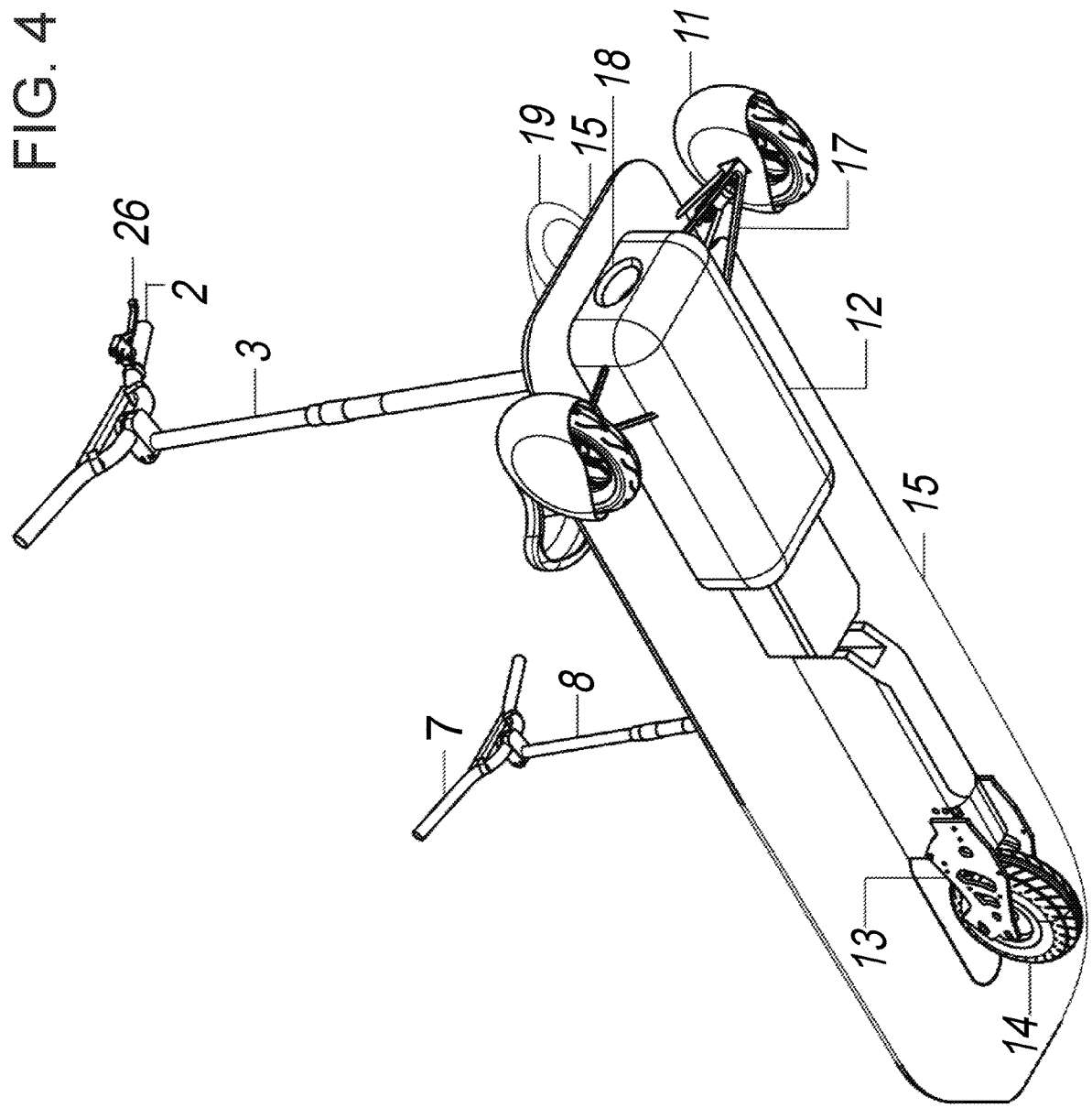

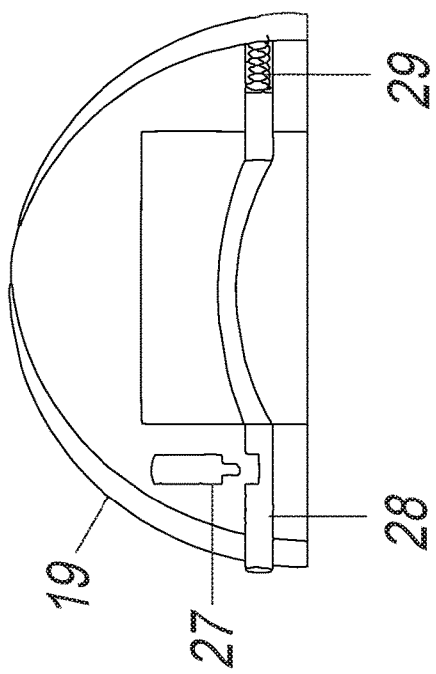
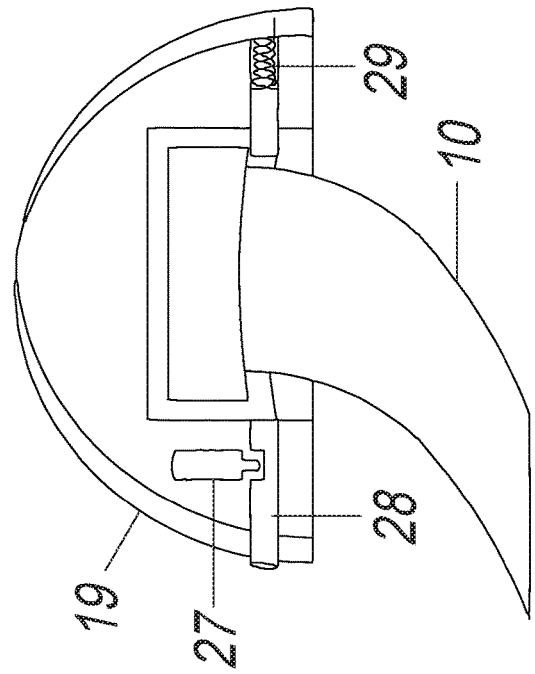

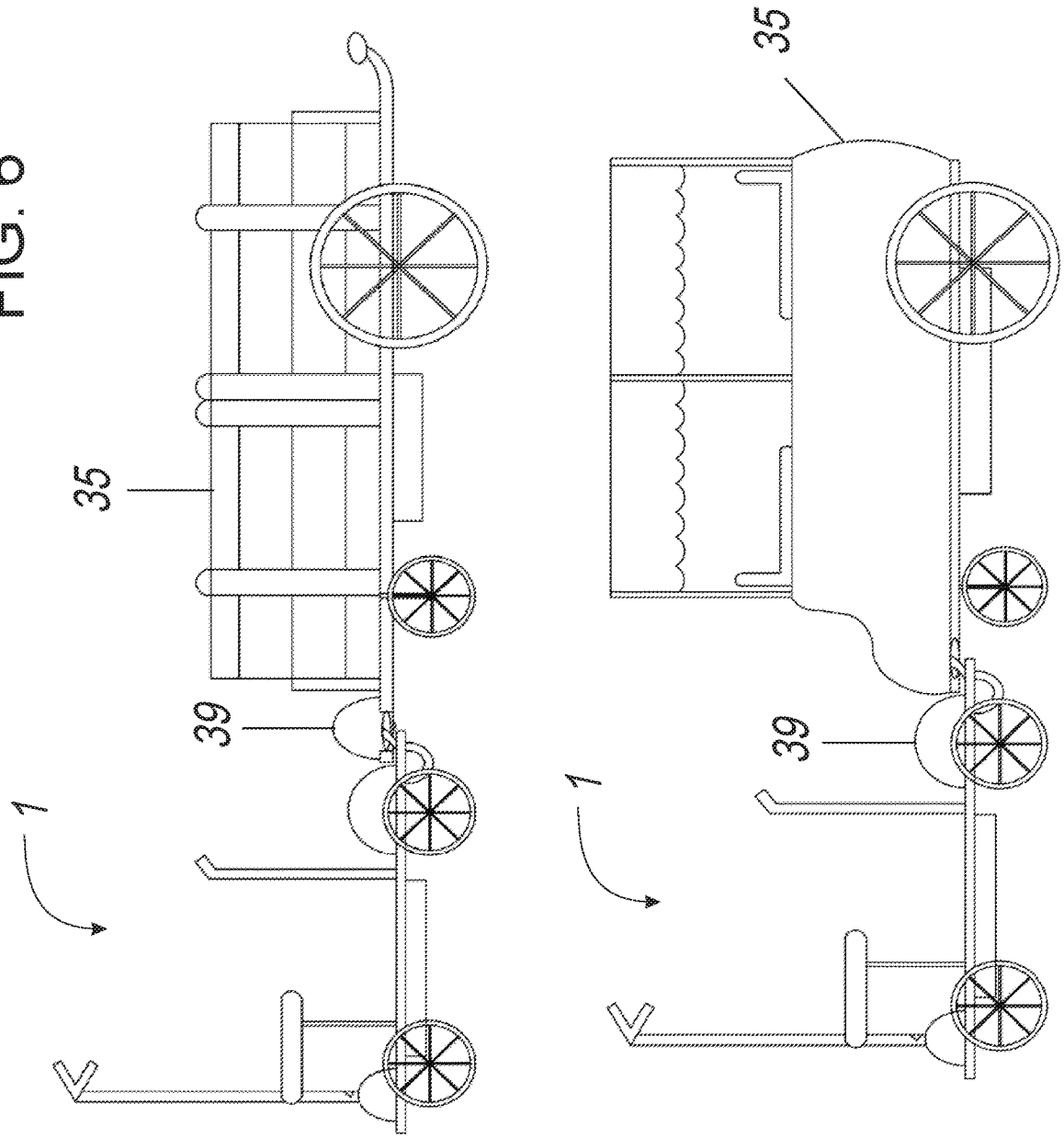

MODULAR SCOOTER WITH SUSPENSION AND COLLAPSIBLE COMPONENTS

CROSS-REFERENCE TO RELATED APPLICATIONS

The present invention claims priority to U.S. Provisional Application Ser. No. 62/773,813 filed Nov. 30, 2018 entitled "iSkut", the disclosure of which is hereby incorporated in its entirety at least by reference.

BACKGROUND OF THE INVENTION

1. Field of the Invention

The present invention relates generally to scooters and more particularly to a modular scooter with suspension and collapsible components.

2. Description of Related Art

Kick scooters have been handmade in industrial urban areas in Europe and the U.S. for at least 100 years. A majority of such scooters were developed as play items made for children to roam the streets. One common homemade version is made by attaching roller skate wheel sets to a board with some kind of handle, usually an old box. The first scooters were constructed of wood, with 3-4 inch wheels having steel ball bearings. An additional advantage of this construction was loud noise, just like from a "real" vehicle. An alternative construction consisted of one steel clamp-on roller skate divided into front and rear parts and attached to a wood beam. In 1974, the Honda company made the 'Kick'n Go,' a scooter driven by a pedal on a lever. While it seemed to be as much effort to "kick" as a regular scooter, the novelty of it caught on and it became popular nevertheless. Before bicycles became popular among children, steel scooters with two small bicycle wheels had been the most useful vehicles for them. Around 1987, many BMX manufacturers produced BMX-like scooters as Scoot. Those manufacturers discontinued their scooters, but some scooter manufacturers were established after years, and still develop similar scooters today. Some of these are used in dense urban areas for utility purposes, being faster than a folding scooter and more convenient than a utility bicycle. Some are made for off-road use and are described as Mountain Scooters. Besides commuting, sports competition and off-road use, large wheel scooters are a favorite for dog scootering where single or team dogs such as huskies pull a scooter and rider in the same way that a sled is pulled across snow. Some Amish are not allowed to ride bicycles, so they ride scooters instead. Today, variations on the kicksled with scooter design features are also available, such as the Kickspark®.

Folding kick scooters optimized for adults generally have more durable parts and are designed with wider decks, hand brake, and larger wheels for smoother transportation instead of less weight and portability. The Xootr Street®, which incorporates 7.1 in wheels with a maximum load of 300 lbs. Go-Ped Know-Ped® scooters have 6 inch wheels with solid-rubber tires with a maximum load of 400 lbs and its variant KickPed® from NYCeWheels® which is stripped of all sensitive parts, such as a handbrake which is replaced with a rear spoon brake in order to make the kick scooter long-lasting and durable. Such scooters are continuing to evolve.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a modular scooter is provided, comprising a deck having a top side and a bottom side, the top side configured to hold one or more users; at least two collapsible handlebar posts extending from the top side of the deck, the at least two collapsible handlebar posts having proximal and distal ends, the proximal ends configured to pivot in relation to the deck, and the distal ends configured to receive handlebars; a plurality of wheels attached to the bottom side of the deck; a propulsion system; and, a braking system, wherein the propulsion system and the braking system are controlled via acceleration and braking controls on at least one handlebar of the handlebars.

In one embodiment, a first hitch attached to an aft portion of the deck is provided and a second hitch attached to a fore portion of the deck is provided. In one embodiment, the first hitch is constructed as a knob and the second hitch is constructed as a socket. In another embodiment, the second hitch it configured to receive a third hitch positioned on an additional scooter or trailer, wherein the third hitch is identical to the first hitch. In yet another embodiment, the second hitch comprising a locking mechanism enabling a coupling mechanism to secure the third hitch of the additional scooter or trailer. In one embodiment, the locking mechanism is electromechanical configured to be controlled by a remote device.

In one embodiment, a collapsible seat post extending from the top side of the deck is provided, wherein the collapsible seat post includes a seat. In one embodiment, the at least two collapsible handlebar posts are telescoping. In one embodiment, the at least two collapsible handlebar posts are each configured to pivot via a coupler attached to the top side of the deck. In one embodiment, the propulsion system is electrical, and includes a battery pack attached to the bottom side of the deck. In one embodiment, the plurality of wheels are three wheels including a pair of wheels positioned at a fore position of the deck and a single wheel positioned at an aft portion of the deck. In another embodiment, the pair of wheels is connected to the deck via a wishbone suspension system. In yet another embodiment, the collapsible seat and the at least two collapsible handlebar posts are removable from the deck.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 3 is a front view of the modular scooter with suspension and collapsible components according to an embodiment of the present invention;

FIG. 4 is a bottom perspectivew view of the modular scooter with suspension and collapsible components according to an embodiment of the present invention;

FIG. 5A illustrates the hitch system of the modular scooter with suspension and collapsible components according to an embodiment of the present invention;

FIG. 5B illustrates the hitch system of the modular scooter with suspension and collapsible components attached to an additional hitch according to an embodiment of the present invention; and, FIG. 6 illustrates exemplary instances of trailers attached to the modular scooter with suspension and collapsible components

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a modular scooter with suspension and collapsible components.

Figure 1:
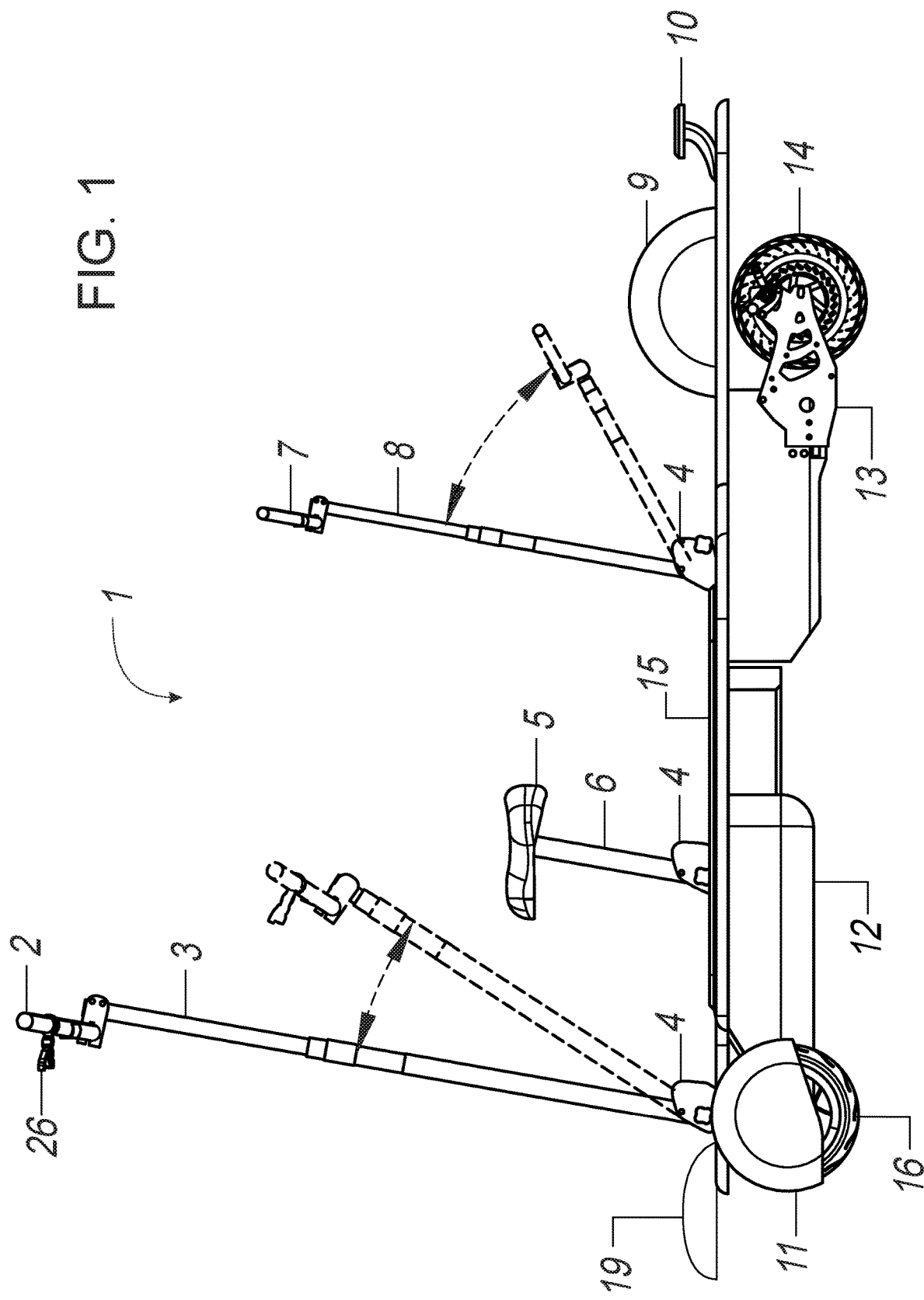
FIG. 1 is a side view of a modular scooter with suspension and collapsible components according to an embodiment of the present invention.
Figure 2:
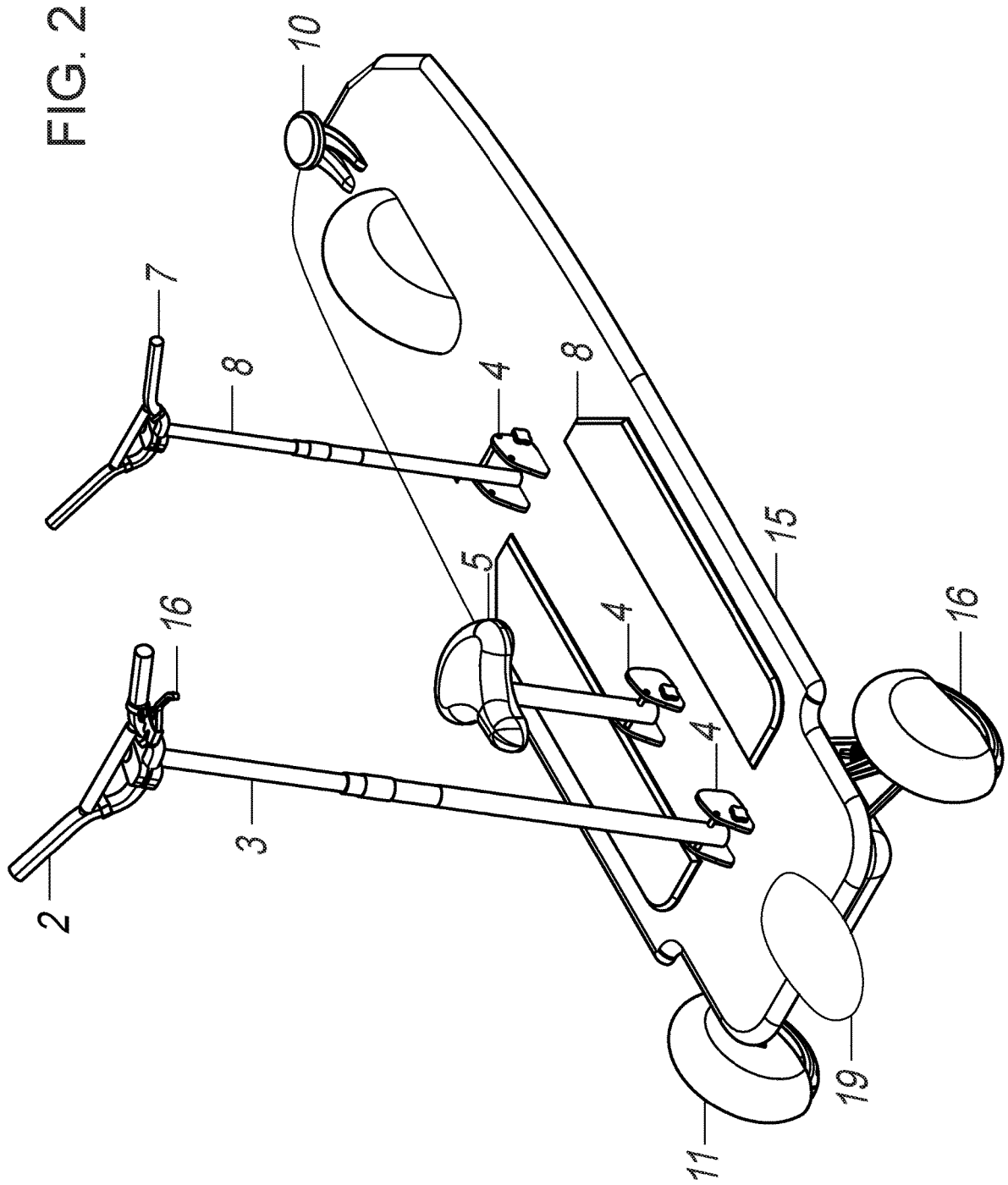
FIG. 2 is a top perspective view of the modular scooter with suspension and collapsible components according to an embodiment of the present invention.

Referring now to any of the accompanying FIGS. 1-6, the modular scooter with suspension and collapsible components is illustrated. The modular scooter 1 comprises a deck 15 having at least one handle bar post extending from the deck. In one embodiment, the modular scooter includes two handle bar posts 3 and 8. Advantageously, each handle bar post 3 and 8 are configured to pivot in relation to the deck via couplings 4. Similarly, a seat post 6 is provided and configured to pivot via coupling 4. The seat post includes a seat 5 at the distal end of the seat post, while the handle bar posts 3 and 8 include handle bars 2 and 7 at the distal end of each handle bar post respectively. Further, in some embodiments, the posts, in particular the handle bar posts are configured to be telescoping posts. Thus, the posts may be folded down when not in use, providing ease of transporting the scooter and limiting its space for storage.

Advantageously, the multiple posts and handle bars allow for a user to transport passengers, for instance multiple adults or a parent and child combination. Similarly, an adult may control the scooter and the child may sit in the seat 5. It should be understood, that although two posts and handle bars are illustrated, three or more posts and handlebars and/or seats may be provided.

The deck is constructed as a flat planar deck is configured to receive three wheels. The three wheels providing stability as opposed to the common two wheel arrangement in most scooters. In one embodiment, the deck is constructed from a rigid material, including but not limited to fiberglass, carbon fiber, metal, or other rigid materials. In some embodiments, a pair of deck pads 8 positioned on the top surface of the deck is provided, wherein the deck pads are made of material providing grip aiding to help a user maintain secured footing while using the scooter. In some embodiments, there are two wheels 16 positioned in the front of the deck and a single wheel positioned in the rear of the deck 14. In some embodiments, the front wheels 16 include protective covering 11, such as cowlings or fenders. In one embodiment, a wheel cover 9 is provided configured to provide a protective covering for the rear wheel 14. The wheels are connected to the deck via a suspension system 17. In one embodiment, the suspension system is a wishbone suspension and spring system, however it should be understood that other suspension systems may be utilized. The spring system providing shock absorption while allowing the scooter to lean left and right during use such that the riders can lean into the turns as well known in the art.

In some embodiments, a pair of hitches 10 and 19 is provided, wherein the first hitch 10 is positioned on the aft or rear of the deck and the second hitch 19 is positioned in the fore or front of the deck. The pair of hitches is configured to lock with additional scooters. More specifically, the second hitch of one scooter is configured to receive the first hitch of a second scooter. In one embodiment, the second hitch 19 is constructed as a socket, and the first hitch 10 is constructed as a knob, wherein the socket is configured to receive the knob. It should be understood that other configurations are possible. In one embodiment, the pair of hitches is constructed from a rigid material, such as metal or similar. In one embodiment, the second hitch 19 includes an electromechanical locking mechanism, best seen in FIGS. 5A-B, configured to allow a user to lock (and unlock) two attached scooters. The electromechanical locking mechanism comprising a coupling mechanism 28 enabling the second hitch 19 to secure a first hitch 10 of an additional scooter. In one embodiment, the coupling mechanism includes an actuator affixed to a solenoid 27, plunger, or the like. In one embodiment, the electromechanical locking mechanism and the coupling mechanism are controlled via a remote device, such as a cell phone via Bluetooth®. In one embodiment, the coupling mechanism includes a coupling ring and spring 29 to bias the coupling ring in a closed arrangement to secure an attached first hitch 10, as seen in FIG. 5B. In some embodiments, the pair of hitches is configured to selectively control which scooters, i.e. hitches are attachable.

In some embodiments, the scooter includes an electric propulsion system having a rechargeable battery pack 12 attached to a bottom portion of deck 15, wherein the rechargeable battery provides the power to rotate one or more wheels as well known in the art. In one embodiment, the rechargeable battery pack includes lithium ion batteries. It should be understood, that other propulsion systems may be provided, although electric is preferred as it produces zero emissions.

As expected, the scooter includes a breaking system configured to stop at least one wheel from rotating. In one embodiment, the rear wheel is affixed with the breaking system by means of swing arms 13 attached to deck 15. In some embodiments, the breaking system and the electric propulsion system are controlled via calipers/throttle 26 provided on handlebar 26 to control the acceleration and braking of the system.

The scooter further comprising safety lighting positioned at least on the front portion of the scooter and in some embodiments, on the rear portion. In one embodiment, the safety lighting includes LED headlights 18. In one embodiment, the LED headlights are affixed or integrated in a front portion of the battery pack 12.

Best seen in FIG. 6, in addition to additional scooters as previously discussed, the first hitch enables the connection to a trailer 35, wherein the trailer includes a trailer hitch 39 identical to the second hitch as described above. As one skilled in the art can appreciate, the trailer may be any type of trailer known in the art, including but not limited to a storage trailer, a child trailer, a foot cart, a flatbed trailer, or similar.

Advantageously, the scooter of the present invention is configured to be modular enabling a user to customize the configuration of the deck. For instance, the user may remove and/or add various posts for additional handlebars and/or seats as desired. In some embodiments, sidewalls and shelving units may be added to create storage areas.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention. For example, in some embodiments, the scooter may include carrying handles, protective bumpers, etc.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A modular scooter comprising:
   a deck having a top side and a bottom side, the top side configured to hold one or more users;
   at least two collapsible handlebar posts extending from the top side of the deck, the at least two collapsible handlebar posts having proximal and distal ends, the proximal ends configured to pivot in relation to the deck, and the distal ends configured to receive handlebars;
   a plurality of wheels attached to the bottom side of the deck;
   a propulsion system;
   a braking system, wherein the propulsion system and the braking system are controlled via acceleration and braking controls on at least one handlebar of the handlebars
   a first hitch attached to an aft portion of the deck and a second hitch attached to a fore portion of the deck.

2. The modular scooter of claim 1, wherein the first hitch is constructed as a knob and the second hitch is constructed as a socket.

3. The modular scooter of claim 1, wherein the second hitch it configured to receive a third hitch positioned on an additional scooter or trailer, wherein the third hitch is identical to the first hitch.

4. The modular scooter of claim 3, wherein the second hitch comprising a locking mechanism enabling a coupling mechanism to secure the third hitch of the additional scooter or trailer.

5. The modular scooter of claim 4, wherein the locking mechanism is electromechanical configured to be controlled by a remote device.

6. The modular scooter of claim 1, further comprising a collapsible seat post extending from the top side of the deck, wherein the collapsible seat post includes a seat.

7. The modular scooter of claim 6, wherein the collapsible seat and the at least two collapsible handlebar posts are removable from the deck.

8. The modular scooter of claim 1, wherein the at least two collapsible handlebar posts are telescoping.

9. The modular scooter of claim 1, wherein the at least two collapsible handlebar posts are each configured to pivot via a coupler attached to the top side of the deck.

10. The modular scooter of claim 1, wherein the propulsion system is electrical, and includes a battery pack attached to the bottom side of the deck.

11. The modular scooter of claim 1, wherein the plurality of wheels are three wheels including a pair of wheels positioned at a fore position of the deck and a single wheel positioned at an aft portion of the deck.

* * * * *